United States Patent [19]

Eke

[11] Patent Number: 4,653,461

[45] Date of Patent: Mar. 31, 1987

[54] TRIVET FOR A MICROWAVE OVEN

[75] Inventor: Kenneth I. Eke, Sanderstead, England

[73] Assignee: Microwave Ovens Ltd., Surrey Cro, England

[21] Appl. No.: 631,241

[22] Filed: Jul. 16, 1984

[30] Foreign Application Priority Data

Jul. 19, 1983 [GB] United Kingdom ................. 8319726
Feb. 7, 1984 [GB] United Kingdom ................. 8403259

[51] Int. Cl.⁴ .......................... A47J 37/00; A21B 1/00

[52] U.S. Cl. ........................... 126/21 A; 99/DIG. 14; 99/444; 99/446; 219/10.55 E; 219/10.55 F; 219/10.55 R

[58] Field of Search ................. 126/383, 21 A, 337 A, 126/337 R; D7/323, 351, 402, 403, 409, 388; 99/444, 445, 446, 451, DIG. 14; 219/10.55 E, 10.55 F, 10.55 R, 391, 392; 312/264; 426/243; 211/134, 150

[56] References Cited

U.S. PATENT DOCUMENTS

| | | | |
|---|---|---|---|
| 3,230,864 | 1/1966 | Krayewski | 99/446 |
| 3,845,266 | 10/1974 | Derby | 219/10.55 E |
| 3,941,968 | 3/1976 | MacMaster et al. | 219/10.55 E |
| 3,972,318 | 8/1976 | Lenoir | 99/446 |
| 3,994,212 | 11/1976 | Wong | 99/444 |
| 4,074,102 | 2/1978 | Asen | 219/10.55 E |
| 4,092,512 | 5/1978 | Suzuki | 219/10.55 E |
| 4,140,889 | 2/1979 | Mason, Jr. et al. | 99/DIG. 14 |
| 4,186,217 | 1/1980 | Tchack | 99/444 |
| 4,208,561 | 6/1980 | Sitzler | 219/10.55 E |
| 4,249,464 | 2/1981 | Hansen | 219/10.55 E |
| 4,283,614 | 8/1981 | Tanaka et al. | 219/10.55 R |
| 4,453,064 | 6/1984 | Toyoda et al. | 219/10.55 F |
| 4,455,467 | 6/1984 | Dills | 219/10.55 F |

*Primary Examiner*—Samuel Scott
*Assistant Examiner*—H. Odar
*Attorney, Agent, or Firm*—Penrose Lucas Albright

[57] ABSTRACT

A microwave oven has a trivet in the form of a perforated metal plate which is a receptacle for food, is metal and is supported on a turntable of the oven. The metal plate and the turntable are both insulated by stove enamel to prevent sparking. The plate and the turntable enclose a space which is thereby shielded from electrical fields generated in the microwave oven so that fats and juices draining into the space from food cooked above the trivet do not absorb substantial quantities of microwave power and therefore do not boil or smoke. A rack may be placed on the trivet to support food at a level higher than the trivet.

12 Claims, 4 Drawing Figures

TRIVET FOR A MICROWAVE OVEN

DESCRIPTION

1. Field of the Invention

This invention relates to a trivet for a microwave oven.

2. Background to the Invention

A known trivet for a microwave oven rests on a rotating turntable of the oven and supports the food to be cooked. When cooking meat, particularly lamb, the fat draining from the meat passes through apertures in the trivet and into the dished turntable where it continues to absorb energy so that it eventually vaporizes and gives off clouds of fat smoke which fill the oven and find their way into the surroundings, particularly when the oven door is opened. A main object of the invention is to provide a trivet in which this problem is substantially overcome.

SUMMARY OF THE INVENTION

According to one aspect of the invention a trivet for a microwave oven comprises a metal panel of a perforate or mesh material which substantially prevents the passage of microwave energy through the panel and electrical insulating means for preventing sparking between the panel and an adjacent metal tray on which the trivet rests, in use the panel being supported on the metal try so as to enclose, between the trivet and the tray, a space for the collection of fat and other deposits draining through the panel from food cooked in the oven.

The panel may be made in any way which allows fat and other juices to drain therethrough, while blocking the passage of microwave energy. A preferred panel is a perforated metal sheet but the panel may be woven from wire to form a mesh of the required density.

It is essential to prevent any metal-to-metal contact between the panel and the tray, and this is conveniently achieved by stove enamelling the tray, or the panel or (most preferably) both the panel and the tray. An alternative possibility is to provide a separate insulating beading located between the panel and the tray. The tray may be a metal turntable having an upstanding rim on which the peripheral edge of the trivet rests. Alternatively, the tray may be intended to be stationary within the oven.

The trivet and turntable may be used in association with a stand which supports food above the trivet. This enables certain foods like joints of meat to be cooked on the stand where they absorb the desired high degree of microwave energy, and foods such as potatoes to be placed on the trivet, where the microwave energy is less because of the presence of the panel. The combination of the trivet and stand therefore enables a joint of meat and potatoes, for example, to be cooked simultaneously and for the same cooking time, without the potatoes absorbing too much microwave energy and becoming too soft, which has been a problem in the past.

According to another aspect of the invention there is provided a trivet for a microwave oven in combination with a metal tray, the trivet being apertured to permit the passage therethrough of fats or juices and the trivet being supportable on the tray so as to enclose, between the trivet and the tray, a space for the collection of the fats or juices draining through the trivet from food cooked in the oven on or above the trivet, and electrical insulating means for preventing sparking between the panel and the tray, the trivet and the tray substantially preventing microwave energy from reaching said space.

BRIEF DESCRIPTION OF THE DRAWINGS

A trivet according to the invention will now be described, by way of example, with reference to the accompanying drawings which show the trivet used in combination with a rotating turntable and a stand. In the drawings.

DESCRIPTION OF THE PREFERRED EMBODIMENT

Figure 1:
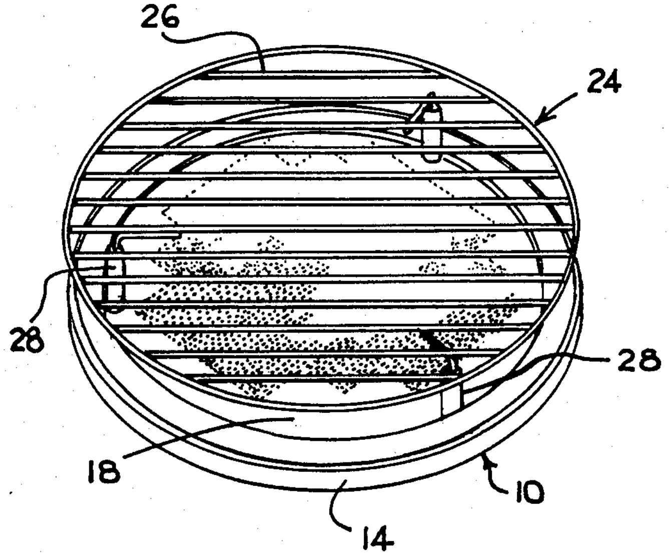
FIG. 1 is a perspective view of the turntable, trivet and stand in their operative positions.
Figure 2:
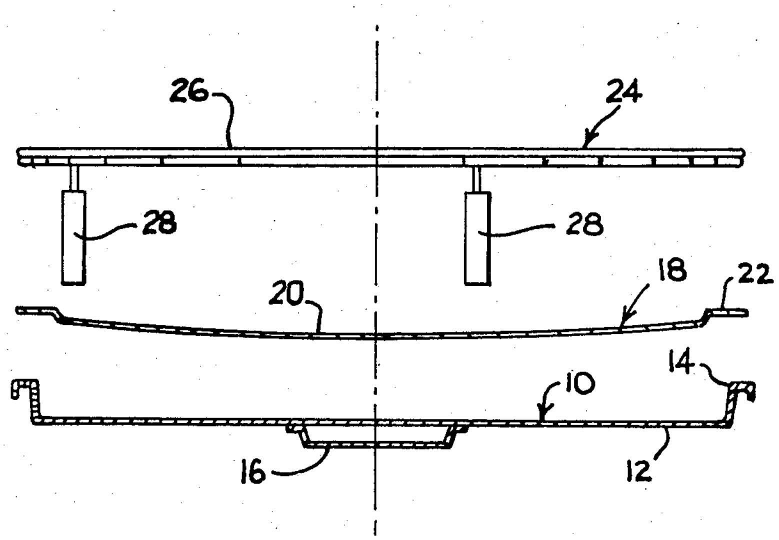
FIG. 2 is a sectional view showing the turntable, trivet and stand separated.

A support means comprising a circular turntable 10 is a conventional metal turntable having a dished base 12, an upstanding rim 14, and a central formation 16 which is shaped to engage with rotary drive means in the base of the microwave oven to enable the turntable 10 to be rotated.

A receptacle means comprising a trivet 18 comprises a slightly dished, circular panel 20 having circular perforations sufficiently closely spaced to prevent the passage of microwave energy through the panel. The trivet 18 and the turntable 10 are each stove enamelled. Such enamel coating constitutes electrical insulating means for preventing sparking between trivet 18 and turntable or tray 10. A peripheral edge 22 of the panel 20 rests on the rim 14 of the turntable 10 when the trivet 18 is placed in position on the turntable 10 (FIG. 1).

Above the trivet 18 there may be arranged a stand 24 having a top in the form of a wire rack 26 and three legs 28 which rest on the panel 20 so as to support the rack 26 in spaced relationship above the trivet 18.

Figure 3:
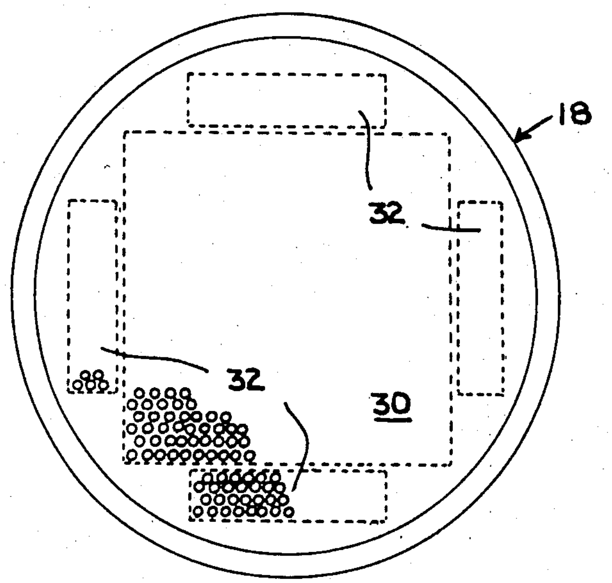
FIG. 3 is a diagrammatic plan view of the trivet.

FIG. 3 shows the pattern of perforations in the trivet 18. The perforations extend over a main central square area 30 and also over four subsidiary, elongate areas 32.

In use, the trivet 18 and stand 24 are placed on the turntable 10, as shown in FIG. 1. Foods such as joints of meat which require substantial amounts of microwave energy to cook, are placed on the wire rack 26. Potatoes, which need somewhat less microwave energy to cook, are placed on the trivet 18. It will be appreciated that the energy density in a region immediately above the trivet 18 is substantially less than higher up in the microwave oven because of the presence of the perforated mesh of the trivet 18. This area of reduced microwave energy density enables meat and potatoes, for example, to be placed in the oven simultaneously and to be subjected to the same cooking time, thereby avoiding the need for differential cooking times as has been common hitherto.

Any fat or other deposits which drain from the food being cooked pass through the mesh of the trivet 18 and into the space between the trivet 18 and the turntable 10. Microwave energy cannot reach this space and hence the fat does not have any tendency to vaporize. In consequence, fat smoke is not produced.

Figure 4:
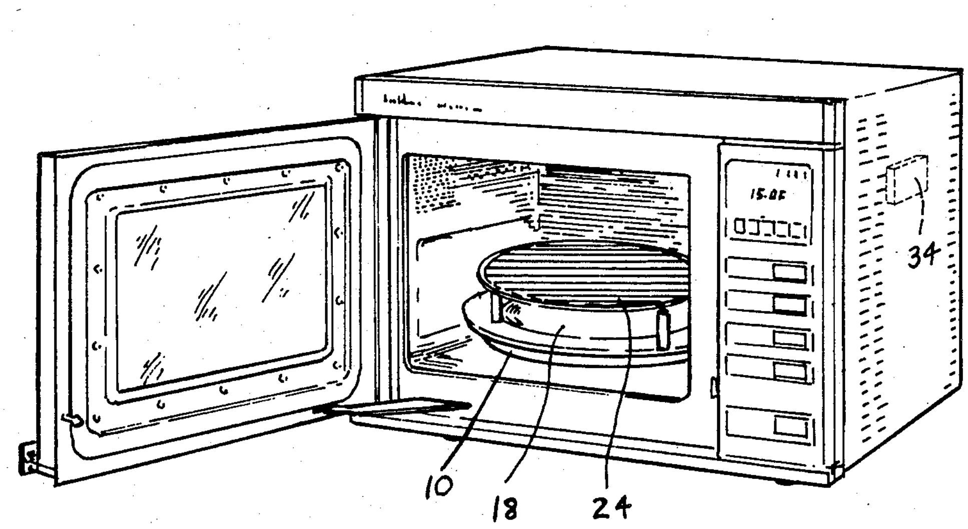
FIG. 4 is a perspective view of a microwave oven showing the trivet and stand in position on the oven turntable.

FIG. 4 shows the trivet 18 and stand 24 placed on the turntable 10 in the cavity of a microwave oven, ready for use. The oven is similar to that disclosed in our UK Patent Application No. 2127658, (U.S. application Ser. No. 513,296 filed July 13, 1983, issued as U.S. Pat. No. 4,508,947, Apr. 2, 1985) and is designed to be powered from a domestic plug/socket. The oven has a magnetron 34 for delivering microwaves into the cavity, as well as an electrical resistance heating element and fan both located behind an apertured rear wall of the cavity. The fan circulates air over the heating element and through the cavity, and thus food in the cavity is subjected to simultaneous microwave power and recirculated hot air, which together cook and brown the food as the latter is rotated.

If desired, the roof of the oven cavity may be provided with an additional resistance heating element, serving as a grill element. This can be advantageous in countries like Japan where power consumption limits for domestic plugs/sockets are modest.

Having disclosed my invention, what I claim as new and to be secured by Letters Patent of the United States is:

1. A microwave oven comprising a rotatable metal turntable located in a base of a cavity of the oven, a metal trivet which is removably supported on said turntable and serves as a surface to support food which rotates within said cavity as a result of rotation of said turntable, a magnetron for supplying microwave energy to said cavity, an electrical heating element, fan means for circulating a forced flow of air over said heating element and through said cavity, said trivet having a plurality of apertures to permit the passage there through of fats or juices draining into said trivet from food cooked in the oven, said trivet and said turntable enclosing between them a space for the collection of said fats or juices draining onto the trivet and from food cooked in the oven on or above said trivet, said metal trivet and said metal turntable being arranged for cooperatively shielding said space from said microwave energy substantially to prevent the latter reaching said space so that said fats or juices collected in said space do not absorb said microwave energy so as to be vaporized and produce fat smoke, and electrical insulating means between said trivet and said turntable which is sufficient to prevent metal-to-metal contact therebetween and sparking between said trivet and said turntable when the oven is being operated.

2. A microwave oven according to claim 1, wherein said electrical insulating means is constituted by an enamel coating on all exterior surfaces of said metal trivet and on the exterior surface of said turntable.

3. A microwave oven according to claim 2, wherein said metal turntable is of dished shape with an upstanding peripheral rim on which a perpheral edge of said trivet rests, whereby the dished shape of the turntable defines the lower side and periphery of said space.

4. A microwave oven according to claim 1, wherein said trivet is apertured by perforations which are arranged in a predetermined pattern and so configured to allow the passage of said fats or juices but not to allow the passage of microwave energy into said space and not to weaken the trivet unduly considering that said trivet is subjected to relatively extreme and sudden temperature changes.

5. A microwave oven according to claim 4, wherein said regular array of perforations extends over a main central square area of said trivet and also over four rectangular areas disposed adjacent respective sides of said square area, leaving the peripheral rim of said trivet unperforated.

6. A microwave oven according to claim 1, wherein said trivet is slightly dished in shape so that it is upwardly concave.

7. A microwave oven according to claim 1 and in combination with a stand which rests on said trivet and rotates with said trivet and said turntable, said trivet providing a lower food-supporting level and said stand providing an upper food-supporting level in said cavity.

8. Food receptacle means for use in the process of cooking in a microwave oven which is of a shallow disk configuration and is a sufficient electrical conductor to act as a shield to the high frequency electric fields generated for cooking purposes in said microwave oven, in combination with a support means therefor which also is a sufficient electrical conductor to act as a shield to the high frequency electric fields generated for cooking purposes in a microwave oven, and electrical current insulation means, said support means adapted supportingly to receive said food receptacle means to define a space therebetween which is effectively shielded from the high frequency electric fields generated for cooking purposes in said microwave oven, and said insulation means being between said food receptacle means and said support means sufficiently to prevent sparks from occurring between them caused by high voltages induced in electrical conductors in said receptacle means and said support means by said high frequency electric fields generated in said microwave oven, perforations through said food receptacle means into said space which are sufficient for draining from said receptacle means liquids from food heated in said microwave oven over said food receptacle means quickly and effectively into said space while blocking microwave energy from said space, said space being shielded from high frequency electrical fields generated by said microwave oven sufficiently to prevent said liquids from being vaporized by said high frequency electrical fields.

9. The combination of claim 8 wherein said food receptacle means and said support means are separately coated by said insulation means.

10. The combination of claim 9 wherein said support means comprises a turntable in said microwave oven.

11. The combination of claim 10 wherein said food receptacle means comprises a trivet which has all of its exterior surfaces coated by said insulator means which comprises enamel.

12. The combination of claim 11 wherein there are a plurality of perforations through the top of said trivet into said space, said perforations being of such extent and nature that said space remains effectively shielded from the electric fields of said microwave oven.

* * * * *